United States Patent
Machado

[11] Patent Number: 6,080,372
[45] Date of Patent: Jun. 27, 2000

[54] TWO STAGE REACTOR FOR CONTINUOUS THREE PHASE SLURRY HYDROGENATION AND METHOD OF OPERATION

[75] Inventor: Reinaldo Mario Machado, Allentown, Pa.

[73] Assignee: Air Products and Chemicals, Inc., Allentown, Pa.

[21] Appl. No.: 09/151,625

[22] Filed: Sep. 11, 1998

[51] Int. Cl.$^7$ .................................. B01J 8/08; B01J 8/22
[52] U.S. Cl. .................... 422/190; 422/140; 422/141; 422/189; 422/231; 422/225; 422/215
[58] Field of Search .................... 422/140, 141, 422/142, 225, 215, 224, 229, 231, 234, 190, 189, 230, 213, 227, 132, 134, 135, 144, 145, 147, 129, 187, 188; 261/87, 85, 148, 29, 93; 585/926, 921; 366/102, 164.1, 164.2, 164.3, 164.5; 435/296.1

[56] References Cited

U.S. PATENT DOCUMENTS

| | | | |
|---|---|---|---|
| 1,806,381 | 5/1931 | Baensch | 261/93 |
| 2,245,130 | 6/1941 | Guillissen | 423/352 |
| 3,759,669 | 9/1973 | Aaron et al. | 422/215 |
| 4,259,294 | 3/1981 | Van Zijll Langhout et al. | 422/190 |
| 5,133,941 | 7/1992 | Hays et al. | 422/140 |

*Primary Examiner*—Hien Tran
*Assistant Examiner*—Susan Ohorodnik
*Attorney, Agent, or Firm*—Willard Jones, III

[57] ABSTRACT

A continuous stirred tank reactor is paired with a bubble column reactor to enhance conversion in a continuous process, e.g. hydrogenation, wherein a gaseous reactant is mixed with a liquid. The continuous stirred reactor is fitted with a specialized impeller system to circulate the liquid and enhance contact of the liquid with reactant gas carried over from the bubble column.

18 Claims, 1 Drawing Sheet

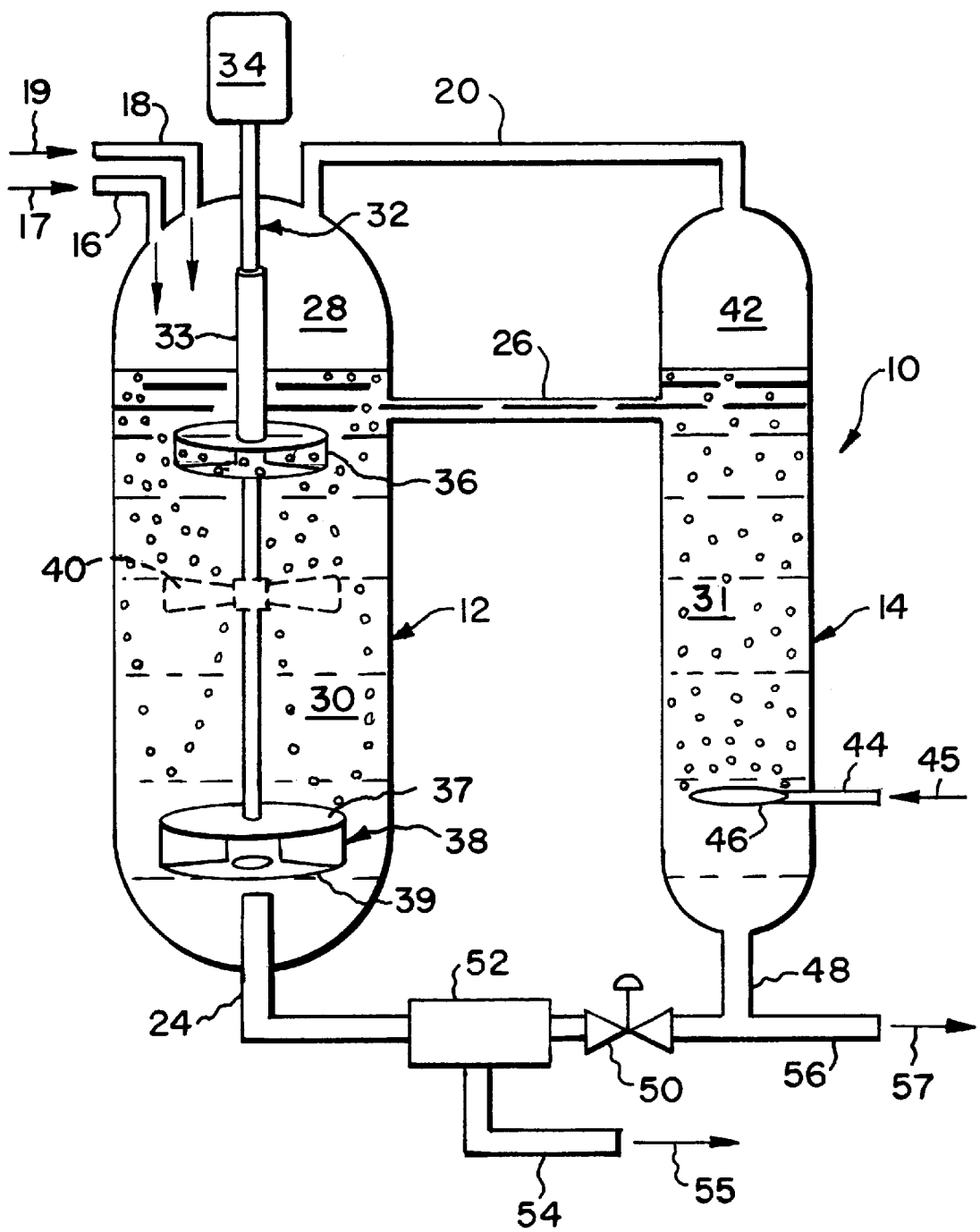

TWO STAGE REACTOR FOR CONTINUOUS THREE PHASE SLURRY HYDROGENATION AND METHOD OF OPERATION

BACKGROUND OF THE INVENTION

The present invention pertains to continouous reactor processes and in particular to the use of continuous stirred tank reactors and/or bubble columns to effect such processes.

Hydrogenation processes wherein three distinct phases, i.e. a material to be hydrogenated, hydrogen gas, and a catalyst are brought together in either a continuous stirred tank reactor (CSTR) or a bubble column are well known in the industry.

In view of the fact that most hydrogenation processes take place at elevated pressure, bubble column reactors are generally less costly than continuous stirred tank reactors. Bubble columns can be constructed taller and narrower than CSTR reactors and therefore require thinner reactor walls, thus lessening the amount of material of construction and the cost. Also, a bubble column requires no mechanical agitation, thus further reducing initial cost and further reducing maintenance costs for such reactors. In a bubble column, hydrogen gas is introduced into the bottom of the column and must be dispersed to create a high gas-liquid contact area for mass transfer and to provide liquid mixing in the column to effect proper reaction and heat transfer. To effect mixing by controlling the flow rates of hydrogen gas, a much greater quantity of hydrogen gas is used than is dictated by stoichiometric conditions for the particular reaction. Thus, excess hydrogen must be used in the process or a hydrogen recovery and recycle apparatus, usually employing a compressor to recycle the hydrogen exiting the column, is used.

Depending upon the throughput of a continuous process, very often a single reactor is not sufficient to provide adequate residence time to generate high conversion in a single reactor and thus two or more reactors in series are required. Carrying out gas-liquid reactions in two or more columns is quite common, however, where three phase slurry hydrogenation is desired using a solid catalyst, use of single reactors becomes a challenge with problems that are not easily overcome. In general hydrogenation catalysts have sufficient activity and life and can remain in a process for days, compared to the liquid residence times of a process which might require only minutes or hours. This large difference in residence times means that the catalyst must be maintained in a uniform distribution when multiple reactors are used. Each reactor may require catalyst separation equipment and the ability to recycle the catalyst.

Thus, the use of a single continuous stirred tank reactor or a bubble column may not have sufficient residence time to maintain high conversion requiring two reactors of the same type in series.

The slurry catalyst in continuous stirred tank reactors must be separated and returned to each individual reactor. Thus multiple reactors in series each require individual catalyst separation equipment such as cross flow filters.

Multiple bubble columns in series can be used to increase overall conversion but require hydrogen flow rates greatly in excess of the stoichiometric requirement to achieve both sufficient mixing and high conversion in the reactor.

Also it is well known that a single continuous stirred tank reactor must be significantly larger and generally more expensive than two smaller continuous stirred tank reactors in series to achieve the same overall conversion.

Thus it can be seen that a multi stage slurry hydrogenation process using conventional technology is problematic and economically disadvantageous, thus creating a need to solve these problems.

SUMMARY OF THE INVENTION

The present invention is uniquely suited to continuous three phase slurry hydrogenation processes requiring two hydrogenation reactors used in series to enhance conversion. According to the present invention a continuous stirred tank reactor with a specialized impeller system is combined with a conventional bubble column, thus avoiding problems commonly encountered with bubble columns. For example, the present invention relates to a reactor system that would be ideally suited for the continuous hydrogenation of glucose to sorbitol.

Thus in one aspect the present invention is a slurry hydrogenation system comprising in combination; a continuous stirred tank reactor adapted to contain a liquid to be hydrogenated and a catalyst with head-space for hydrogen gas, the reactor having a single agitation system having first means to draw head-space hydrogen gas into the liquid and a second means to pump liquid from a bottom portion of a bubble column in fluid communication with the reactor, a bubble column arranged in sequence with the reactor, the bubble column having means to introduce gaseous hydrogen adjacent to a bottom location of the bubble column, the bubble column connected to the reactor by gas transfer means to permit gas to flow from a head-space in the column to a head-space in the reactor, the column also fitted with fluid transfer means to permit fluid to flow from a bottom portion of the column to a bottom portion of the reactor and from an upper portion of the reactor to an upper portion of the column, with means to withdraw a hydrogenated product from the system.

In another aspect, the present invention is a two stage continuous reactor comprising in combination, a continuous stirred tank reactor adapted to contain a liquid to be treated by a reactant gas with head-space for the reactant gas, the stirred tank reactor having a single agitation system having first means to draw head-space reactant gas into the liquid and a second means to pump liquid from a bottom portion of bubble column in fluid communication with the stirred tank reactor, a bubble column arranged in sequence with the stirred tank reactor, the bubble column having means to introduce gaseous reactant adjacent to a bottom location of the bubble column, the bubble column connected to the stirred tank reactor by gas transfer means to permit gas to flow from a head-space in the column to a head-space in the stirred tank reactor, the column also fitted with fluid transfer means to permit fluid to flow from a bottom portion of the column to a bottom portion of the stirred tank reactor and from an upper portion of the stirred tank reactor to an upper portion of the column with means to withdraw a treated product from the system.

The system of the present invention includes an optional axial pumping device in the continuous stirred tank reactor.

Another feature of the system of the present invention is the need for only a single catalyst filtration system in order to maintain the catalyst in the dual reactor system.

The present invention also pertains to a method of hydrogenating a liquid comprising the steps of; introducing the liquid to be hydrogenated into a two stage reactor system comprising in combination a continuous stirred tank reactor adapted to contain a liquid to be treated with a reactant gas and a head-space for the reactant gas, the stirred tank reactor having a single agitation system having first means to draw the head-space reactant gas into the liquid and a second means to purge (draw) liquid from a bottom portion of a bubble column in fluid communication with the stirred tank reactor, and a bubble column arranged in sequence with the stirred tank reactor, the bubble column having means to to introduce a reactant gas adjacent to a bottom location of the bubble column, the bubble column connected to the stirred tank reactor by gas transfer means to permit the reactant gas to flow from a head-space in the column to a head-space in the stirred tank reactor, the bubble column fitted with fluid transfer means to permit fluid to flow from a bottom portion of the bubble column to a bottom portion of the stirred tank reactor and from an upper portion of the stirred tank reactor to the upper portion of the column, introducing hydrogen into the two stage reactor as the reactant gas, and withdrawing a hydrogenated product from the two stage reactor system.

BRIEF DESCRIPTION OF THE DRAWING

The single FIGURE of the drawing is a schematic representation of the system according to the present invention.

DETAILED DESCRIPTION OF THE INVENTION

Referring to FIG. 1, the system 10 includes a stirred tank reactor 12 and a bubble column 14. The stirred tank reactor 12 has an upper portion containing an inlet 16 for catalyst, represented by arrow 17, to be introduced into the reactor 12 and an inlet conduit 18 for feeding the liquid, represented by arrow 19, into the reactor 12. The top or head-space 28 of the reactor 12 is connected via a conduit 20 to the top or head-space 42 of the bubble column 14 as shown. A conduit 24 in the bottom of reactor 12 permits fluid to be drawn into the reactor 12 as will hereinafter be more fully explained. As shown in the drawing the reactor 12 is such that a level of liquid to be hydrogenated is maintained in the reactor with a head-space 28 for gaseous reactant to be present above the liquid 30.

Disposed within the reactor 12 is an agitator shaft 32 which is adapted for rotation about a longitudinal axis of the reactor 12 by a motor 34. Mounted on the shaft is an upper agitator 36 of the type that will induce or draw the head-space gas contained in the head-space 28 of reactor 12 into the liquid phase 30 to create sufficient gas-liquid contacting to effect the chemical reaction between the gas and the liquid. As shown in the drawing, the agitator 36 includes a hollow shaft 33 disposed around the agitator shaft 32 which is used to draw head-space gas downwardly between the hollow shaft 33 and the agitator shaft 32 and outwardly of the blade of the upper agitator 36. One such device is manufactured and sold by EKATO Corporation of Ramsey, N.J.

Disposed on the bottom of the agitator shaft 32 is a flat bladed turbine 38 fitted with a top disc 37 which inhibits pumping liquid from within the continuous stirred tank reactor 12 and a bottom disc 39 with a central aperture which permits pumping of the liquid through the line 24 entering the bottom of the continuous stirred tank reactor 12. Such a flat bladed turbine is available from Lightnin Corporation of Rochester, N.Y. It is also within the scope of the present invention to replace the top 36 and bottom 38 impellers with a single specially made impeller that can perform the task of drawing head-space gas into the liquid 30 and pumping liquid 30 into the reactor 12.

Alternatively an axial pumping impeller 40 may be disposed between the agitator 36 and the agitator 38 as is shown. However, the use of the axial pumping agitator 40 is optional and in certain hydrogenation reactions will not be required.

A conduit 26 extends between the continuous stirred reactor 12 and the bubble column 14 at a level that is just below the surface of the liquid in both the continuous stirred reactor 12 and the bubble column 14.

Bubble column 14 is of the conventional type which includes a sparge ring 46 attached to a gas delivery conduit 44 for introducing hydrogen gas represented by arrow 45 into the bubble column 14 to effect the reaction of the liquid 31 with the hydrogen in the column 14. Column 14 also includes a liquid conduit 48 which is connected to conduit 56 which is connected through a control valve 50 to a cross flow filter 52 which in turn is connected to the conduit 24 to permit recirculating movement of the liquid 31 from the bubble column 14 into the continuous stirred reactor 12. Conduit 54 permits filtered product, represented by arrow 55, to be withdrawn from the system. Arrow 57 represents product containing catalyst which can be withdrawn from the system as needed to purge the system of spent or unneeded catalyst.

Control valve 50 is used to regulate the recirculation flow between the continuous stirred reactor 12 and the bubble column 14. Cross flow filter 52 is also in the recirculation line to permit removal of the product 55 while permitting the catalyst to stay in the reactor system 10. Filters of this type are well known and can be installed either vertically or horizontally, depending upon the type of filter selected.

In operation a feed e.g. glucose 19 is introduced through conduit 18 into the continuous stirred reactor 12. A catalyst, e.g., a supported nickel catalyst, 17 is introduced via conduit 16 into the continuous stirred reactor 12 at the same time. A liquid level is established in both the continuous stirred reactor 12 and the column 14 at which time hydrogen 45 is introduced via the sparge ring 46 into the liquid contained in the column. Motor 34 is energized and agitator 32 is rotated to begin recirculation of the liquid and the catalyst from the bubble column 14 through the continuous stirred reactor 12 and back to the bubble column. Hydrogen gas, represented by bubbles in the drawing, is introduced into the bubble column 14 via sparge ring 46 in an amount in excess of stoichiometric conditions and permeates upward through the liquid 31 in the column 14. Hydrogen in head-space 42 of column 14 is conducted by a conduit 20 into the head-space 28 of the reactor 12 where, through the action of the agitator 36, it is drawn into the liquid 30. At the same time liquid from the continuous stirred reactor 12 flows through conduit 26 into the column 12 because of the action of agitator 38 which is drawing liquid from the bottom of the column 14 through conduit 48 and 24 into the continuous stirred reactor 12. The recirculation rate is controlled by using valve 50, and product is withdrawn in conduit 54 through the cross flow filter 52 as is well known in the art.

Feed is introduced into the continuous stirred reactor 12 as partially converted to product. The recirculation flow of the liquid from the continuous stirred reactor 12 to the bubble column 14, via conduit 26, permits a completion of the reaction in the bubble column 14. A key to the operation of the system of the present invention is to take the necessary steps to have approximately greater than 50% of the reaction between the hydrogen and the liquid taking place in the continuous stirred reactor 12. This permits hydrogen flow through the bubble column 14 which is greatly in excess of the stoichiometric requirement to complete the reaction in the bubble column 14. As is typical in most hydrogenation reactors the hydrogen feed rate is automatically regulated to maintain the reactor at a fixed pressure and is equal to the total hydrogen consumption via reaction in both reactors which are at the same pressure. The excess hydrogen exiting the top of the bubble column is then conducted to the continuous stirred reactor 12 via conduit 20.

The use of a hydrogen flow rate in excess of the stoichiometric requirement to complete the reaction in the bubble column 14 is necessary to provide mixing in a bubble column 14. The catalyst is uniformly suspended in the continuous stirred tank reactor 12 via the mechanical agitation and in the bubble column 14 via excess hydrogen flow.

Periodically catalyst can be removed by conduit 56 in a purge stream and fresh catalyst can be introduced into the continuous stirred reactor 12 via conduit 16. This permits a controlled and uniform level of catalyst to be maintained in both the reactor 12 and the bubble column 14. Heat removal can be accomplished in each reactor using techniques which are well known in the art.

The following example of hydrogenation of glucose to sorbitol further illustrates the benefits achieved utilizing the present invention. A continuous stirred tank reactor, CSTR, 1.2 m in diameter, is fitted with four 0.1 m wide baffles which run the length of the reactor. The reactor volumes for various runs are described in Table 1 below. A spiral heat exchanger in the reactor is used for heat removal and maintains the reactor at 140° C. The CSTR is fitted with an agitator system consisting of three 0.4 m diameter impellers, the top portion of the agitator shaft is a hollow with an opening to the gas head-space of the reactor which allows gas to flow into and through the gas induction impeller. A gas induction impeller consisting of four 0.03 m diameter tubes extending perpendicular to the agitator shaft is located 0.4 m below the liquid surface and the tubes are connected via the hollow portion of the agitator shaft. The middle impeller consists of four flat blades at a 45° pitch. The bottom impeller is a flat bladed turbine with six blades and is shrouded on the top with a solid disc while the bottom disc has a 0.1 m hole in the center. A 0.025 diameter pipe extends from the bottom recycle line through the bottom of the CSTR to the inlet of the bottom impeller. The agitator is operated at 300 rpm.

The bubble column in runs 2 and 5 consists of a 6 m tall shell and is 0.5 m in diameter. Fresh, make-up hydrogen is dispersed in the bottom of the bubble column from a porous metal disc with 100 micron holes. The bubble column is connected to the CSTR with two 0.025 m diameter pipes, one for the bottom recycle line and one for the overflow line. The headspace of the CSTR and bubble column are connected via a 0.1 m diameter pipe. The exit of the bubble column prior to the filter operates at a flow rate of 2.0 m$^3$/hr.

The filter located at the bottom of the bubble column consists of multiple porous metal filter tubes with a total 0.4 m$^2$ of filtration area. Filtration occurs on the inside of the porous metal tubes. Product flows out a manifold around the filtration tubes and is removed continuously.

Raney® nickel catalyst with an average particle size of 20 microns is charged to the reactor at a concentration of 30 kg/m$^3$. The feed consists of a 50% aqueous solution of glucose and is fed to the CSTR continuously, while the reactor is operated at 140° C. Filtered sorbitol product is continuously removed through the porous filter to maintain the CSTR liquid level constant. Hydrogen gas is fed continuously to the bubble column for Runs 2 and 5, and into the headspace of the CSTR for Runs 1, 3, 4 and 6, to maintain the total pressure at 30 bar.

Results for different process configurations are illustrated in Table 1.

TABLE 1

| Run | Feed Rate, m$^3$/hr | CSTR Volume, m$^3$ | Bubble Column Volume, m$^3$ | Conversion of Glucose To Sorbitol |
|---|---|---|---|---|
| 1 | 1.00 | 2.0 |  | 95.7% |
| 2 | 1.00 | 2.0 | 1.0 | 99.1% |
| 3 | 1.00 | 10.0 |  | 99.1% |
| 4 | 2.00 | 2.0 |  | 91.7% |
| 5 | 2.00 | 2.0 | 1.0 | 98.0% |
| 6 | 2.00 | 8.0 |  | 98.0% |

Runs 1 and 4 illustrate the glucose conversion from a 2 m$^3$ CSTR alone without the bubble column for 1 m$^3$/hr and 2 m$^3$/hr feed rates, respectively. In runs 1, 3, 4 and 6 the bubble column is replaced by a 0.025 m diameter pipe and the hydrogen is fed to the headspace of the CSTR. When the bubble column is added in runs 2 and 5, sufficient mixing and reaction occur to increase the conversion when compared to the single CSTR. Runs 3 and 6 illustrate the excessive size of single CSTR volume necessary to obtain the same conversion from the combined 2 m$^3$ CSTR ad 1 m$^3$ bubble column.

Thus an apparatus according to the present invention provides sufficient residence time for a liquid to be hydrogenated in the system to maintain high conversion rates. Using a system according to the present invention requires only a single catalyst separation system such as the cross flow filter.

Eliminating multiple bubble columns greatly reduces the total amount of excess hydrogen required.

Lastly, the combined reactor permits use of a smaller continuous stirred tank reactor to achieve same overall conversion that can be achieved in a single significantly larger and generally more expensive continuous tank reactor.

Having thus described my invention what is desired to be secured by letters patent of the United States is set forth without limitations in the appended claims.

What is claimed is:

1. A slurry hydrogenation system comprising in combination:
   a continuous stirred tank reactor for containing a liquid to be hydrogenated said reactor having a catalyst and a head-space for hydrogen gas, and a single agitation system having first means to draw said head-space hydrogen gas into said liquid and a second means to purge liquid from a bottom portion of a bubble column in fluid communication with said reactor;
   said bubble column arranged in sequence with said reactor, said bubble column having means to introduce a gaseous hydrogen adjacent to a bottom location of said bubble column, said bubble column connected to said reactor by gas transfer means to permit said gas to flow from a head-space in said column to the head-space in said reactor, said column having first fluid transfer means to permit fluid to flow from a bottom portion of said column to a bottom portion of said reactor and second fluid transfer means to permit fluid to flow from an upper portion of said reactor to an upper portion of said column; and,
   means to withdraw a hydrogenated product from said system.

2. A system according to claim 1 including means to remove catalyst from said first fluid transfer means.

3. A system according to claim 1 wherein said means to withdraw said hydrogenated product includes a catalyst filtration system.

4. A system according to claim 1 wherein a third means to induce axial pumping of said liquid with catalyst and hydrogen gas is included in said reactor between said means to draw head-space hydrogen gas into said liquid and said second means to draw liquid from said bottom portion of said column.

5. A system according to claim 1 wherein said first means to draw said head-space hydrogen gas is an impeller which will draw said hydrogen into said liquid containing said catalyst.

6. A system according to claim 1 wherein said second means to purge said liquid from said bubble column is a generally flat bladed turbine fitted with a top disc to inhibit pumping of liquid from within said reactor and a bottom disc with a central aperture to pump liquid from said bubble column to said reactor.

7. A system according to claim 1 wherein said means to introduce hydrogen into said bubble column includes a sparge ring disposed in a bottom portion of said column, said sparge ring connected to a source of hydrogen gas.

8. A two stage continuous reactor comprising in combination:

a continuous stirred tank reactor for containing a liquid to be treated with a reactant gas and, said stirred tank reactor having a head-space for said reactant gas and a single agitation system having first means to draw said head-space reactant gas into said liquid and a second means to purge liquid from a bottom portion of a bubble column in fluid communication with said stirred tank reactor;

said bubble column arranged in sequence with said stirred tank reactor, said bubble column having means to introduce a gaseous reactant adjacent to a bottom location of said bubble column, said bubble column connected to said stirred tank reactor by gas transfer means to permit said gas to flow from a head-space in said column to the head-space in said stirred tank reactor, said column having first fluid transfer means to permit fluid to flow from a bottom portion of said column to a bottom portion of said stirred tank reactor and second fluid transfer means to permit fluid to flow from an upper portion of said stirred tank reactor to an upper portion of said column; and, means to withdraw a product from said first fluid transfer means.

9. A two stage continuous reactor according to claim 8 including means to remove a catalyst from said first fluid transfer means.

10. A two stage continuous reactor according to claim 9 wherein said means to withdraw said product includes a catalyst filtration system.

11. A two stage continuous reactor according to claim 9 wherein a third means to induce axial pumping of said liquid with said reactant gas is included in said stirred tank reactor between said means to draw head-space reactant gas into said liquid and said second means to draw liquid from said bottom portion of said column.

12. A two stage continuous reactor according to claim 9 wherein said first means to draw said head-space reactant gas is an impeller which will draw said reactant gas into said liquid containing said catalyst.

13. A two stage continuous reactor according to claim 9 wherein said second means to purge said liquid from said bubble column is a generally flat bladed turbine fitted with a top disc to inhibit pumping of liquid from within said stirred tank reactor and a bottom disc with central aperture to pump liquid from said bubble column to said stirred tank reactor.

14. A two stage continuous reactor according to claim 9 wherein said means to introduce reactant gas into said bubble column includes a sparge ring disposed in a bottom portion of said column, said sparge ring connected to a source of reactant gas.

15. A method of hydrogenating a liquid comprising the steps of:

introducing said liquid to be hydrogenated into a two stage reactor system comprising in combination a continuous stirred tank reactor adapted to contain a liquid to be treated with a reactant gas and a head-space for said reactant gas, said stirred tank reactor having a single agitation system having first means to draw said head-space reactant gas into said liquid and a second means to purge liquid from a bottom portion of a bubble column in fluid communication with said stirred tank reactor, and the bubble column arranged in sequence with said stirred tank reactor, said bubble column having means to introduce a gaseous reactant adjacent to a bottom location of said bubble column, said bubble column connected to said stirred tank reactor by gas transfer means to permit said gas to flow from a head-space in said column to the head-space in said stirred tank reactor, said column having first fluid transfer means to permit fluid to flow from a bottom portion of said column to a bottom portion of said stirred tank reactor and second fluid transfer means to permit fluid to flow from an upper portion of said stirred tank reactor to an upper portion of said column;

introducing hydrogen into said bubble column of said two stage reactor as said reactant gas; and withdrawing a hydrogenated product from said reactor system.

16. A method according to claim 15 including introducing a hydrogenation catalyst into said reactor along with said liquid to be hydrogenated.

17. A method according to claim 16 including periodically withdrawing a stream of hydrogenated product along with said catalyst from said system and adding fresh catalyst to said system.

18. A method according to claim 16 wherein a supported nickel catalyst is introduced into said two stage reactor.

* * * * *